April 17, 1956
J. L. LANDRY
2,742,185
METHOD AND APPARATUS FOR FEEDING AND
DISPENSING PARTICULATE MATERIALS
Filed Jan. 11, 1954
2 Sheets-Sheet 1
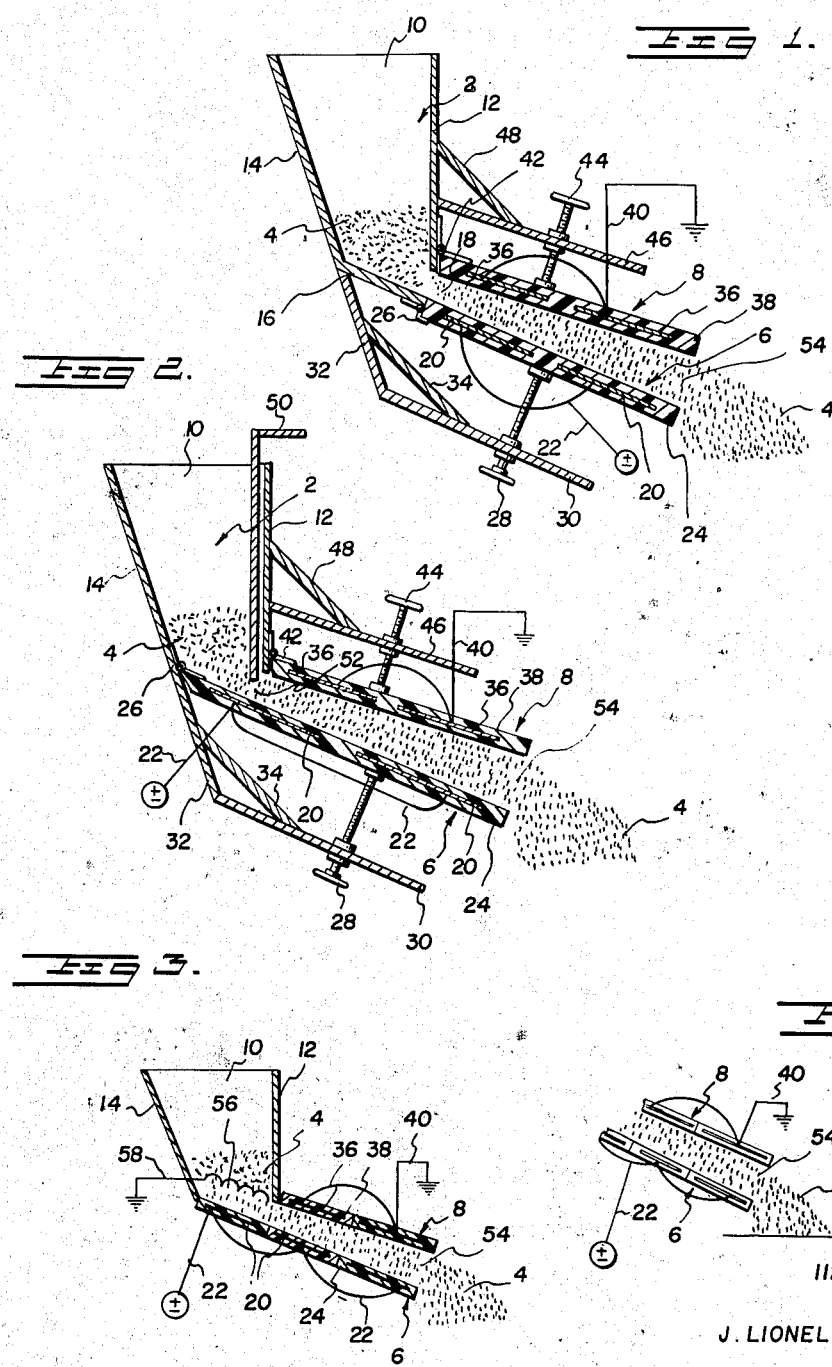
INVENTOR
J. LIONEL LANDRY.
BY Hugh E. Smith
ATTORNEY

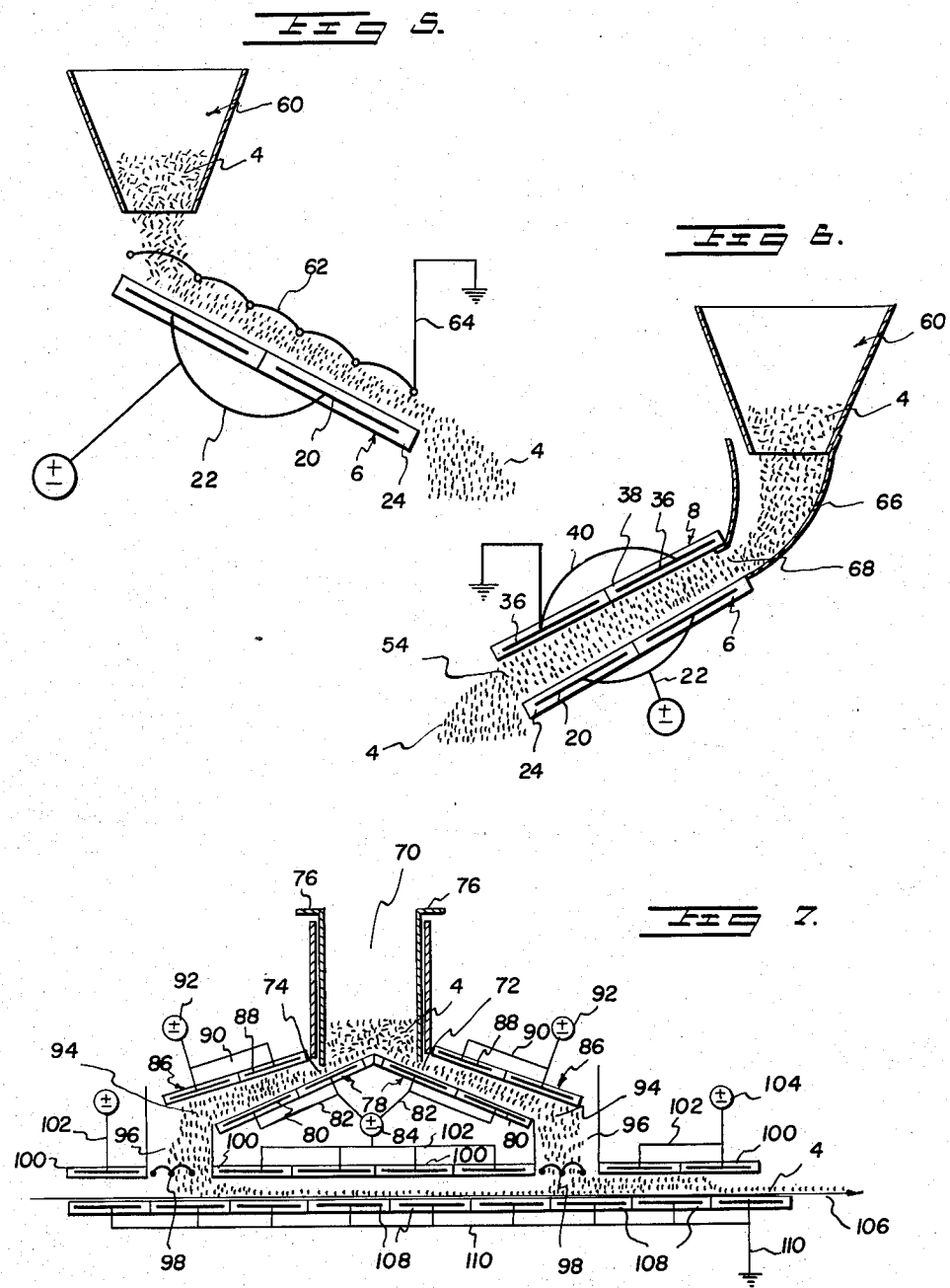

United States Patent Office 2,742,185
Patented Apr. 17, 1956

2,742,185

METHOD AND APPARATUS FOR FEEDING AND DISPENSING PARTICULATE MATERIALS

J. Lionel Landry, Waterford, N. Y., assignor, by mesne assignments, to Norton Company, Worcester, Mass., a corporation of Massachusetts Application January 11, 1954, Serial No. 403,207

11 Claims. (Cl. 222—1)

This invention relates to methods for feeding and dispensing particulate materials and apparatus for carrying out such methods. More specifically, the invention concerns procedures for feeding and dispensing fibers, powders, grains, small spherical particles and similar materials in a uniform manner and without recourse to vibrating or oscillating screens or trays or other mechanically moving devices.

Field of invention

Many different forms of apparatus are known for feeding, conveying and dispensing particulate materials such as abrasive grains, short fibers or cut filaments, powders such as wheat flour, small spherical particles of plastic materials such as fine beads of polystyrene or polymethyl methacrylate and similar particles. One basic form of such feeders or conveyors utilizes vibrating or oscillating screens or trays. Another basic type of conveyor employs a porous, sloped table or screen over which the solid particles are moved by passing a stream of air or other gas upwardly through the porous screen to maintain the particles in a state of movement.

The vibrating or oscillating type conveyor is noisy and usually causes disturbances in the areas in which it is employed. Furthermore, such feeders are troublesome from a mechanical viewpoint because of the strains which are created in the equipment and surrounding supporting structures by the vibrations or oscillations used to operate the conveyors. Likewise, these feeders cause lumping or clustering of many types of particles so that the particles cannot be fed or conveyed in them.

The pneumatic type of conveyor presents the problem of dust formation and loss of material due to particles being carried out of the feeding zone by the air blast used for conveying. Furthermore, this type of conveyor has a tendency to agglomerate many types of materials and to cause them to be fed in uneven or lump form.

Objects

Principal object of this invention is the provision of new methods for feeding and conveying of particulate material.

Further objects include:

1. The provision of a new type of apparatus for the feeding and dispensing of fibrous, granular or other subdivided materials.

2. The provision of methods and apparatus for feeding finely-divided materials such as spherical particles of plastic material, cereal grains, abrasive grains, flock or other short fibrous materials, and equivalent particulate materials without the use of vibrating or oscillating screens or trays or any other moving parts.

3. The provision of apparatus and means for feeding or conveying such particles and then dispensing the particles in a non-agglomerated form free of lumps, strings, clusters or similar groups of particles.

4. The provision of apparatus for feeding particulate material in which the rate of feeding can be accurately controlled by the mere turning of a dial in the same way the flow of water is controlled through a pipe by turning a valve.

5. The provision of apparatus which makes possible the dispensing of particulate materials onto a travelling web with the particles being uniformly dispersed from one another upon delivery from the feeding apparatus to the web.

6. The provision of new methods and apparatus for feeding finely-divided materials such as flock or particles of plastic material from a hopper onto a web such as a sheet of paper or textile, with the flock or particles being dispersed uniformly from one another to give even particle coating of the web.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

General description

These objects are accomplished according to the present invention by providing a source of supply of particulate material; providing a sloping surface onto which particulate material may be fed from said source of supply; permitting particulate material to feed from the source of supply onto said surface; and subjecting the particles fed to said sloped surface to an electrostatic field which is imposed across the sloped surface substantially in a direction normal to the surface whereby the particles are caused to move across the sloping surface by the electrostatic field.

Preferably, the sloped surface across which the particulate material moves is adjusted to an angle slightly less than the angle of repose of the particles and the rate of flow of the particles is controlled by regulating the potential of the electrostatic field.

Detailed description

A more complete understanding of the new methods and apparatus of this invention may be had by reference to the accompanying drawings in which:

Fig. 1 is a diagrammatic side sectional view of one form of a feeding and dispensing device of this invention;

Fig. 2 is a diagrammatic side sectional view of a modified form of the new feeding and dispensing device;

Fig. 3 is a diagrammatic side sectional view of yet another form of the new feeding and dispensing apparatus.

Fig. 4 is a diagrammatic view of the dispensing end of apparatus of this invention illustrating the feeding of particles onto the top surface of a travelling web.

Fig. 5 is a diagrammatic side sectional view of still another form which the apparatus of this invention may assume.

Fig. 6 is a diagrammatic side sectional view of another modified form of the new apparatus.

Fig. 7 is a diagrammatical side sectional view of a double channel conveying and dispensing device for feeding small particles onto the top surface of a travelling web to give a uniform distribution of the particles on the surface of the web such as in the coating of paper or textiles with a sparse coating of particles.

Referring in detail to the drawings, the feeding and dispensing apparatus basically comprises a source of supply 2 for the particulate material 4, a sloping surface 6 and means 8 for establishing an electrostatic field with lines of force running substantially normally to the sloping surface 6.

The particulate material source 2 consists of a hopper 10 formed with front panel 12 and back panel 14. In the apparatus of Fig. 1, the hopper 10 has a sloped bottom 16 and a front entering opening 18 is formed between the bottom 16 and the lower end of front panel 12.

The sloping member 6 comprises a plurality of internal, plate-like electrodes 20 which may be made, for example, of sheet copper, sheet aluminum, wire mesh or other electrically conducting material. Electrode elements 20 are connected by electrical leads 22 to a source of high potential alternating or pulsating current (not shown). The plate-like electrodes 20 are imbedded in a sheet of insulating material 24. This insulated sheet may be formed of wood, or plastic or any other suitable insulating material and is preferably made by laminating thin sheets of insulating material with the electrodes 20 inside. However, if desired, the electrodes 20 may be located on the outside bottom of the sheet 24 and could be formed, for example, by cementing a sheet of metal to the bottom of a wooden board, plastic plate or the like.

The sloping member 6 is fastened at its upper end by hinge 26 to the lower end of the hopper bottom 16.

The angle at which element 6 is held relative to the horizontal is controlled by the screw member 28 which is threaded through the support 30 held beneath the sloping member 6 by the extension 32 and brace 34.

The upper electrode element 8 comprises a plurality of plate-like electrodes 36 imbedded within the insulating element 38. Electrodes 36 and sheet 38 are preferably of the same type of construction as electrodes 20 and sheet member 24. Internal electrodes 36 are connected by electrical leads 40 to ground or to the other pole of the source of high potential.

The upper electrode member 8 is hinged at its upper end to front panel 12 by the hinge 42 and may be adjusted at the desired slope by the screw member 44. Adjusting screw 44 is threaded through support member 46 fastened to front panel 12 and held in position by brace 48.

The apparatus of Fig. 2 is similar to that of Fig. 1 except that the fixed sloped bottom 16 for the hopper 10 is eliminated and the sloping member 6 is extended at its upper end so that it is held by the hinge 26 upon the back panel 14 of the hopper 10. The apparatus of Fig. 2 is also provided with an adjustable gate 50 which may be raised and lowered to control the flow of particulate material 4 through the opening 52 formed between the upper surface of member 6 and the lower edge of front panel 12. As will be explained later, the gate 50 is of use primarily in the initial charging of the hopper 10 with the particulate material 4 and is not needed for actual control of the flow of particles, the flow of particles being controlled by the potential which is imposed between the lower electrodes 20 and the upper electrodes 36.

The apparatus of Fig. 3 is similar to that shown in Fig. 1 with the exception that the lower sloping member 6 comprises three instead of two electrodes 20 and its upper end is hinged to back panel 14 rather than to a fixed hopper bottom as in Fig. 1. Also, an electrode grid 56 is located within the hopper 10 near the bottom and this grid is connected by an electric lead 58 to ground or the opposite pole of the source of potential from the electrodes 20. This grid 56 serves to disperse particles of material passing from hopper 10 onto the sloping member 6 and cooperates with electrodes 36 in controlling the rate of feed of particulate material from hopper 10 down between members 6 and 8 and out the lower end-opening 54 of the apparatus.

In contrast to the previously described apparatus, that shown in Figs. 5 and 6 comprises a mechanical hopper designated 60. This mechanical hopper may be of any of the variety of common type such as roll feeds of the type used to dispense abrasive grain in the manufacture of coated abrasives, a roll or sifter feeder of the type used in the flock coating art, a vibrating or oscillating type of sifter such as used in dispensing or feeding flour or similar powdered materials, or any other comparable mechanical feed hopper.

In the apparatus of Fig. 5, the particulate material 4 feeds from the mechanical hopper 60 through an open electrical grid 62 which is connected by a lead 64 to ground or one terminal of a source of high potential. The particles pass through the grid 60 onto the upper surface of the sloping member 6 which, as in Figs. 1 through 3, is formed of plate-like electrodes 20 and insulating encasement 24.

In the apparatus of Fig. 6, the mechanical hopper dispenses the particles 4 into the funnel 66 which guides the particles into the upper end opening 68 formed between sloping elements 6 and 8.

For the sake of simplicity, the sloping member angle adjusting means have been omitted in Figs. 3 through 7, but it will be understood that they may be included as discussed and shown relative to Figs. 1 and 2.

Fig. 7 shows an assemblage of the basic feeding and dispensing elements or units as described in connection with Figs. 1 to 6 to form a double-feed electrostatic feeder used to dispense particulate material onto the upper surface of a travelling web. A particulate material 4 is contained within the hopper 70 which has two lower dispensing openings 72 and 74, the sizes of which are controlled by the gates 76.

The bottom of the hopper 70 is formed by sloping members 78 which are hinged together at their upper ends and are arranged so that the slope of their upper surface may be increased or decreased depending upon the angle of repose of the particulate material to be fed from a hopper 70.

Members 78 comprise electrodes 80 electrically connected by leads 82 to the source of potential 84.

Top electrode members 86 are hinged at their upper end to the sides of the hopper 70 so that they too may be adjusted to various angles depending on the angle at which the members 78 are positioned. The upper plate members 86 comprise electrodes 88 which are connected by leads 90 to the opposite pole of source of high potential electric current from pole 84. The lower end-opening 94 formed between the members 78 and 86 leads to the duct 96 at the base of which are located the electrode grids 98. On either side of the ducts 96 there are positioned electrode elements 100 connected by leads 102 to sources of high potential 84 and 104.

A sheet or web 106 is mounted for travel below the electrodes 100, grids 98 and ducts 96 and above the line of lower electrode elements 108 which are connected by the common lead 110 to ground.

*Description of operation*

A wide variety of different kinds of particulate materials may be fed and dispensed with the new apparatus described above although it is more advantageously used with certain types of particulate material than with others. Thus, the equipment is preferably used with non-conducting or dielectric material. Various sizes of particles may be fed and dispensed in the equipment, but it is most successfully employed in the feeding of small size particles. Illustrative of the general size of particles best handled by the apparatus are those having an average particle size similar to abrasive grain of grit size 600 on up to particles of an average size comparable to abrasive grain of grit size 36, but particles larger or smaller than this may also be handled in the equipment.

Examples of the large variety of particulate material which may be handled by this new type of feeding equipment includes abrasive grains such as flint, garnet, silicon carbide, aluminum oxide and the like, plastic or resinous materials such as the plastic beads obtained through the dispersion or emulsion polymerization of such materials as styrene, methyl methacrylate, and copolymers of these materials with other polymerizable substances. Ground or powdered plastic materials such as phenolic resins, vinyl resins, acrylic resins, alkyd resins and the like are further examples. Likewise, sawdust, wood flour, glass beads, cereal grain, cereal grain flours, fibers or fibrous materials such as rayon, cotton, wool, or synthetic fiber flock or the like may be handled with this equipment. The apparatus is particularly useful in feeding and dispensing finely-divided materials of the type which tend to pick up an electrical charge due to frictional contact with one another and to agglomerate or form themselves into clusters when fed in previously-known mechanically-driven feeders or dispensers. The plastic beads and flock mentioned above are good examples of this type of material.

Use of the new equipment is fundamentally the same regardless of variations in the specific form of the apparatus used.

Referring to Fig. 1, the particulate material 4 is charged into the hopper 10 and the sloped member 6 is adjusted by the screw element 28 to an angle slightly less than the angle of repose of the particulate material 4. This angle of repose is easily determined because with the hopper 10 filled with particulate material 4, the particles will continue to flow out of the hopper and down across the surface of the member 6 until it has been raised to an angle slightly less than the angle of repose. At this point, the particles will cease flowing from the hopper 10 and will remain at rest on the upper surface of the member 6. Actually, with the member 6 adjusted to the proper angle, hopper 10 can be completely filled and no particles will flow out of end 54 of the apparatus until the electrostatic potential is applied because the particles pile up upon the upper end of member 6 and prevent any additional material from passing through the hopper opening 18.

When the member 6 has been adjusted to an angle slightly less than the angle of repose, the upper electrode unit 8 is adjusted by the screw element 44 so that the opening 54 between the lower ends of members 6 and 8 is slightly greater than the opening 18 between the upper ends of these members. As an example of dimensions, the opening 18 may vary, for example, from one-tenth of an inch to about 2 inches while the opening 54 may vary from about one-half inch to three or more inches. The angle of repose varies for different particulate material and the apparatus is adjusted by suitable movement of members 6 and 8 for each different material to be handled in the equipment.

With members 6 and 8 adjusted as described and particulate material charged into hopper 10, an electrostatic field is created between the electrodes 20 and 36 by applying high potential voltage to the leads 22 and 40. The electric current used can be rectified alternating current, pulsating direct current, interrupted alternating current, or preferably, alternating current of any convenient frequency, e. g., 60 cycle A. C. single-phase current.

The potential actually used in operating the equipment will vary depending upon the dimensions of the electrodes 20 and 36, the insulating material of which the imbedding sheets 24 and 38 is made, the distances between the members 6 and 8 and various other factors as will be appreciated by those familiar with the operation of electrostatic equipment. As an example, potentials of 1,000 to 100,000 volts or more can be employed.

As indicated above, with no potential applied to the electrodes 20 and 36, particulate material does not move down through the apparatus and out the opening 54. However, as voltage is applied between the electrodes 20 and 36, particulate material begins to pass through opening 18, between electrodes 20 and 36 in a dancing motion, and out opening 54. For any given potential, the rate of feed is substantially constant. As the voltage is increased, the rate of feed and dispensing of the particles is increased so that the control of rate of feeding can be compared to controlling flow of water by means of valve through a pipe. Thus, with the feeding equipment connected to a source of high potential which is controlled by means of a rheostat or similar voltage controlling device, the rate of feeding of the particles through the apparatus can be controlled by turning the rheostat knob in the same fashion as one would control the rate of flow of water from a spigot by turning the valve handle. Turning the voltage off stops the flow of particles; turning the voltage on starts the flow of particles and as the voltage is turned higher and higher the particles are fed through the opening 54 faster and faster.

When a hopper provided with a gate, such as element 50 in Fig. 2, is used, the gate 50 is closed while the hopper is being filled with particulate material. The gate is raised slightly while the slanting element 6 is adjusted to slightly less than the angle of repose and then the gate 50 can be lifted entirely out of the way or the gate 50 can be opened partially so as to aid in the control of the particles from the hopper 10. Thus, with the gate 50 partially closed, particles from the hopper will only be able to flow at a given maximum rate and when the voltage applied between electrodes 20 and 36 exceeds the feeding rate permitted by the gate 50, further increase in voltage between the plates will not affect the rate of dispensing of the particles through the opening 54. Hence, provision of the feeding equipment with a gate or other particle controlling device such as element 50 of Fig. 2 provides an auxiliary rate of feed control and helps to set a maximum for the rate of feed of particles.

One of the outstanding features of this new particle feeding equipment is the dispersed or non-agglomerated condition in which the particles are dispensed from the feed end of the equipment. Thus, many of the mechanical feeders available heretofore have not been useful in feeding or dispensing many types of materials because of the tendency of the particles when fed through such equipment to cluster, agglomerate or otherwise form into large groups of particles. In contrast, particles dispensed by this new electrostatic feeding equipment are completely non-agglomerated and are dispersed from one another. In fact, the dispensed particles tend to fan out and disperse themselves one from the other as is diagrammatically shown in the figures of the drawing. For example, as shown in Fig. 4, the new feeding equipment can be used for coating surfaces of webs, such as sheets of paper or cloth, with particles. Even where the particles are fed in a rather low density per unit area of the sheet 112, they are found to be evenly distributed over the receiving surface of the sheet. Operating in this fashion, sheets of paper, for example, can be coated with small beads of polystyrene at a density of as low as a few beads per square inch of paper surface and still the distribution of the particles is quite uniform across the coated surface of the paper. If the paper surface to which the particles are applied or fed is coated with adhesive material, the particles can be made to adhere to the sheet. Such an operation has been successfully used, for example, in the formation of laminated paper separators for storage batteries, pile surfaces made from flock and coated abrasives.

The operation of the equipment shown in Fig. 3 is substantially the same as that for Figs. 1 and 2, although the grid 56 does aid in additional dispersion of the particles with certain materials which have a strong tendency to agglomerate.

In equipment employing mechanical hoppers such as that shown in Figs. 5 and 6, the bottom feed members 6 and upper electrode members 8 or 62 are adjusted at the proper angle for the particulate material being fed as has been previously described. When these members have been adjusted, the particulate material 4 is fed from the hoppers 60 by mechanical vibration, oscillation or the like of the hopper depending upon the particular form of hopper used. This makes the equipment of Figs. 5 and 6 dependent for the rate of feed of particles to a larger extent upon the rate of supply of the particles from the hopper 60 onto the top surface of the members 6 than is the case of the equipment such as shown in Fig. 1. However, should the hoppers 60 be put into operation with no voltage applied between the electrodes 20 and 62 or 20 and 36 in Fig. 6, the particulate material would merely pile up upon the sloping member 6 and would not feed over the lower end of the member until sufficient voltage is applied between the upper and lower electrode elements to cause the particles to move, in the dancing fashion described, down and out the equipment.

With equipment such as that shown in Figs. 2, 5 and 6 which incorporates some means aside from the applied voltage for controlling the rate of flow of the particles, it is possible to operate the equipment with the members 6 and 8 positioned at an angle greater than the angle of repose of the particulate material and still obtain the feeding and dispensing advantages of the new equipment and particularly the dispersing advantages. In such a case, the rate of flow of the particles through the apparatus is controlled entirely by the gate 50, in the case of the apparatus in Fig. 2, or the rate of dispensing from the mechanical hoppers 60 in the case of the apparatus of Figs. 5 and 6. With a high potential applied between the upper and lower electrode elements in such a case, the particles are dispensed out of the lower end of the equipment in a dispersed, non-agglomerated condition with the rate of flow controlled by gate 50 or hopper 60. Even with the current turned off and the member 6 at an angle greater than the angle of repose, particles will feed from the end of the equipment, but in such case there will not be a dispersion of the particles and they will fall over the lower end of element 6 in much the same fashion as if they were merely dumped from a box or other container. The dispersion and attendant feeding qualities of the apparatus are not, therefore, obtained until an electrostatic field is formed between the upper and lower elements 6 and 8.

The apparatus diagrammatically shown in Fig. 7 is especially designed to feed and disperse particles for the coating of webs such as in the formation of pile surfaced fabrics, in the manufacture of coated abrasives or the like. In the use of this equipment, particulate material such as coated abrasive grain, flock, plastic granules, glass beads or the like are charged into the hopper 70. The lower electrode sheets 78 are adjusted, as described, at slightly less than the angle of repose of the particulate material and members 86 are correspondingly adjusted to give a slightly larger opening 94 than the entrance opening 72. Thereupon, gates 76 are lifted and high tension voltage is applied between the electrodes 80 and 88 through leads 82 and 90 and the particles feed down the equipment, out the openings 94 through the ducts 96 and grids 98 and onto the traveling sheet 106. The particles passing the grids 98 will be substantially uniformly dispersed one from the other and in the case of particles having a longitudinal axis, e. g., flock or abrasive grain, they will be to a large extent oriented with their long axis parallel to each other and normal to the web 106. Maintenance of the orientation of the particles or additional orientation of the particles is brought about by the horizontal electrodes 100 and 108.

Using this type of double feeding apparatus with auxiliary horizontal electrodes, it is possible to produce a granular or fibrous coated sheet 106 having particles with a very high degree of orientation. For example, pile surfaced fabrics or coated abrasives with particles thereon oriented substantially perpendicularly to the sheet can readily be obtained. Even in those cases where only a low density of particles per unit area of the sheet are produced such as by cutting down the rate of feed of particulate material 4 and/or increasing the speed at which the sheet 106 passes through the equipment, coated webs are obtained having uniform distribution of the particles across the surface thereof.

Conclusion

There has been described above a new type of feeding and dispensing apparatus which operates on a basically new principle. The new apparatus may be designed without any mechanically moving parts with the rate of feeding and dispensing of the particles controlled entirely by potential high voltage of input to the equipment. If desired, however, it is possible to augment this basic design by incorporation of mechanically moving feed control mechanisms such as gates, oscillating or vibrating hoppers or the like and the rate of feed can then be controlled by a combination of applied voltage and mechanical feeding.

The new equipment and feeding methods are useful for feeding and dispensing a variety of materials although the equipment is best employed with finely-divided dielectric materials. The new equipment and procedures find greatest use in the feeding of powered or finely subdivided materials which have a tendency to agglomerate and which in many cases have been impossible to feed and dispense in an evenly distributed or dispersed condition by any dispensing equipment known heretofore.

I claim:

1. A method for feeding and dispensing particulate materials which comprises: passing said particulate material from a source of supply onto a downwardly sloping substantially planar, imperforate surface, adjusting the angle of slope of said surface to slightly less than the angle of repose of said particulate material, and subjecting the particles fed to said sloping surface to an electrostatic field whose lines of force cut across said surface, whereby said particulate material is caused to move down said sloping surface and to be dispensed over the lower end of said surface in a dispersed condition.

2. A method for feeding and dispensing particulate material without use of any mechanically moving feeding apparatus which comprises: providing a source of particulate material; discharging by gravity particles from said supply source onto a sloped imperforate surface positioned at an angle slightly less than the angle of repose of said particulate material; and subjecting the particles discharged onto said sloped surface to an electrostatic field whose lines of force cut across said sloped surface, whereby said particulate material is caused to move down said sloped surface and to be dispensed over the lower end of said surface in a dispersed condition.

3. A method for feeding and dispensing particles of dielectric material which comprises: providing a source of supply of said particles; discharging said particles from said source of supply onto a sloping imperforate surface, the angle of slope of said surface being slightly less than the angle of repose of said particles; establishing an electrostatic field across such surface with the lines of force of said field running substantially normally to said sloping surface, whereby said particles are caused to pass downwardly across said surface; and regulating the rate of feeding of said particles across said surface by controlling the potential of said electrostatic field.

4. A method for feeding and dispensing particles of dielectric material which comprises: providing a source of said particles; allowing said particles to feed by gravity from said source onto a sloping imperforate surface, said surface being positioned relative to the horizontal at slightly less than the angle of repose of said particles; establishing an electrostatic field substantially normally to said surface between electrode means positioned above and below said surface; and regulating the rate of feeding of said particles across said surface by controlling the potential of said electrostatic field.

5. A method for feeding and dispensing particles of dielectric material which comprises: providing a hopper for said particles positioned to discharge the particles at least in part by gravity onto the top surface of a sloping imperforate member, said member being fixed with its top surface at an angle to the horizontal slightly less than the angle of respose of said particles; charging particles into said hopper and permitting the particles to discharge from the hopper onto the top surface of said member and to build up on said member until further discharge of the particles from the hopper is prevented by the repose of the first portions of said particles upon the upper section of said member; providing an electrically conducting element behind said top surface of said member out of contact with said particles; providing a second electrically conducting element spaced apart from and above the top surface of said member; applying an electrostatic field across the top surface of said member by connecting said elements to a source of high potential current, whereby said particles are caused to move downwardly over the top surface of said member and discharge over the lower end of the member; and controlling the rate of flow of said particles from said hopper across and off said member by controlling the potential of the electrostatic field existing between said elements.

6. A process as claimed in claim 5 wherein said lower electrically conducting element is plate-like and said upper electrode element is grid-like in configuration.

7. The process of claim 5 wherein both said lower and upper electrically conducting elements are plate-like.

8. The process of claim 7 wherein said upper electrode element is positioned at an angle slightly nearer the horizontal than the angle of said lower electrode element.

9. A method for feeding and dispensing finely-divided particles of dielectric material without the use of vibrating or oscillating screens or trays in a dispersed condition which comprises: providing a hopper for particulate material; charging said hopper with said particles; discharging particles from said hopper onto the top surface of a sloping flat imperforate sheet of insulating material which contains a plate-like electrode imbedded therein, the top surface of said sheet being fixed relative to the horizontal at an angle slightly less than the angle of repose of said particles; providing a second flat sheet of insulating material spaced apart from said first sheet a slight distance therefrom, said second sheet having its lower surface fixed at an angle slightly nearer the horizontal than the top surface of said first sheet so that the opposing surfaces of said sheets are slightly closer together at the top adjacent the point of discharge of said particles onto the top surface of said first sheet than at the lower end of said sheets, said second sheet having imbedded therein a plate-like electrode; applying an electrostatic field across the top surface of said lower sheet between the said imbedded electrodes, whereby said particles are caused to pass downwardly in a dancing motion between said upper and lower sheets and to be dispensed in a dispersed condition out of the lower end of the space existing between said sheets; and controlling the rate of flow of said particles from said hopper down between said sheets and out of said lower end opening by controlling the potential imposed between said electrodes.

10. Apparatus for feeding and dispensing particulate material comprising: a hopper for particulate material; an imperforate member positioned below said hopper; a discharge opening in the lower portion of said hopper; means for guiding particles discharged from said hopper onto the top surface of said member, said member being provided with means for adjusting the top surface thereof to an angle relative to the horizontal slightly less than the angle of repose of particulate material charged into said hopper; and means for establishing an electrostatic field across said member with lines of force of said field running predominantly normally to the top surface of said member.

11. Apparatus for feeding and dispensing particulate material without use of vibrating or oscillating screens or trays which comprises: a source of supply for particulate material; a sloping imperforate member positioned to receive particles from said source of supply onto its top surface; means to adjust the angle of slope of said member to slightly less than the angle of repose of particulate material contained in said source of supply; and means for establishing an electrostatic field across said member with lines of force running predominantly normally to top surface of said member.

References Cited in the file of this patent

UNITED STATES PATENTS

| Number | Name | Date |
|---|---|---|
| 1,222,305 | Kraus | Apr. 10, 1917 |
| 2,245,301 | Schacht | June 10, 1941 |
| 2,306,105 | Grove | Dec. 22, 1942 |
| 2,328,577 | Oglesby | Sept. 7, 1943 |
| 2,352,252 | Conetta | June 27, 1944 |
| 2,357,658 | Johnson et al. | Sept. 5, 1944 |
| 2,361,946 | Johnson | Nov. 7, 1944 |